(12) United States Patent
Levy-Abegnoli et al.

(10) Patent No.: US 8,281,383 B2
(45) Date of Patent: Oct. 2, 2012

(54) SECURED IPV6 TRAFFIC PREEMPTION

(75) Inventors: Eric Michel Levy-Abegnoli, Valbonne (FR); Patrick Grossetete, Marcoussis (FR)

(73) Assignee: Cisco Technology, Inc., San Jose, CA (US)

( * ) Notice: Subject to any disclaimer, the term of this patent is extended or adjusted under 35 U.S.C. 154(b) by 1343 days.

(21) Appl. No.: 11/636,433

(22) Filed: Dec. 11, 2006

(65) Prior Publication Data

US 2008/0137659 A1    Jun. 12, 2008

(51) Int. Cl.
*H04L 29/06* (2006.01)
*G06F 15/16* (2006.01)
*G06F 9/00* (2006.01)
*H04L 12/56* (2006.01)

(52) U.S. Cl. ........... 726/11; 370/392; 370/315; 713/160
(58) Field of Classification Search ................... 713/160; 370/392; 726/11
See application file for complete search history.

(56) References Cited

U.S. PATENT DOCUMENTS

| | | | |
|---|---|---|---|
| 6,795,917 B1 | 9/2004 | Ylonen | |
| 7,539,777 B1 * | 5/2009 | Aitken | 709/248 |
| 2002/0199104 A1 * | 12/2002 | Kakemizu et al. | 713/168 |
| 2003/0223431 A1 * | 12/2003 | Chavez et al. | 370/395.42 |
| 2004/0125797 A1 * | 7/2004 | Raisanen | 370/389 |
| 2004/0268123 A1 * | 12/2004 | Le et al. | 713/160 |
| 2005/0071627 A1 | 3/2005 | Montenegro et al. | |
| 2005/0083936 A1 * | 4/2005 | Ma | 370/392 |
| 2005/0144321 A1 * | 6/2005 | Forsberg | 709/245 |
| 2005/0237983 A1 * | 10/2005 | Khalil et al. | 370/338 |
| 2006/0215592 A1 * | 9/2006 | Tomoe et al. | 370/315 |
| 2007/0201447 A1 * | 8/2007 | Wright | 370/356 |

OTHER PUBLICATIONS

Braden, et al., "Resource ReSerVation Protocol (RSVP)—Version 1 Functional Specification", Network Working Group, Request for Comments: 2205; Sep. 1997, pp. 1-112.
Deering et al., "Internet Protocol, Version 6 (IPv6) Specification", Network Working Group, Request for Comments: 2460, Dec. 1998, pp. 1-39.
Narten et al., "Neighbor Discovery for IP Version 6 (IPv6)", Network Working Group, Request for Comments: 2461, Dec. 1998, pp. 1-93.
Thomson et al., "IPv6 Stateless Address Autoconfiguration", Network Working Group, Request for Comments: 2462, Dec. 1998, pp. 1-25.
Nichols et al., "Definition of the Differentiated Services Field (DS Field) in the IPv4 and IPv6 Headers", Network Working Group, Request for Comments: 2474, Dec. 1998, pp. 1-20.

(Continued)

*Primary Examiner* — Nathan Flynn
*Assistant Examiner* — Trang Doan
(74) *Attorney, Agent, or Firm* — Leon R. Turkevich

(57) ABSTRACT

In one embodiment, a method includes receiving, by an access router, an Internet Protocol version 6 (IPv6) packet that specifies a request for executing a preemptive service for data packets specifying a prescribed flow label field value identified in the request. The method further includes attempting authentication of the request by the access router based on a prescribed secure authentication protocol. The method further includes implementing the preemptive service by the access router based on the authentication of the request, including passing any IPv6 data packet received from a host node and having an IPv6 header specifying the prescribed flow label field value and satisfying a prescribed security condition, and limiting transfer of any data packet that does not specify the prescribed flow label field value or satisfy the prescribed security condition.

21 Claims, 4 Drawing Sheets

OTHER PUBLICATIONS

Blake et al., "An Architecture for Differentiated Services", Network Working Group, Request for Comments: 2475, Dec. 1998, pp. 1-36.
Awduche et al., "Requirements for Traffic Engineering Over MPLS", Network Working Group, Request for Comments: 2702, Sep. 1999, pp. 1-29.
Herzog, "RSVP Extensions for Policy Control", Network Working Group, Request for Comments: 2750, Jan. 2000, pp. 1-13.
Rajahalme et al., "IPv6 Flow Label Specification", Network Working Group, Request for Comments: 3697, Mar. 2004, pp. 1-9.
Arkko et al., Secure Neighbor Discovery (SEND) Network Working Group, Request for Comments: 3971, Mar. 2005, pp. 1-56.
Aura, "Cryptographically Generated Addresses (CGA)", Network Working Group, Request for Comments: 3972, Mar. 2005, pp. 1-22.

* cited by examiner

SECURED IPV6 TRAFFIC PREEMPTION

TECHNICAL FIELD

The present disclosure generally relates to routers prioritizing transfer of Internet Protocol Version 6 (IPv6) packets based on a determined priority of the packets, where high priority IPv6 packets can preempt lesser-priority IPv6 packets.

BACKGROUND

Numerous proposals have been offered for providing guaranteed quality of service (QoS) in an Internet Protocol infrastructure for data flows identified as associated with a particular network service, such as video or voice. The known proposals, however, suffer from at least one of the disadvantages of: (1) requiring prior (or manual) complex configuration of routers for static reservation of network resources; (2) limiting dynamic reservation of network resources to available network resources that have not already been reserved for another data flow; or (3) a lack of security that may allow a malicious source to capture reserved resources by spoofing values in an unsecured IP packet.

For example, Multiprotocol Label Switching—Traffic Engineering (MPLS-TE) as described for example in the Internet Engineering Task Force (IETF) Request for Comments (RFC) 2702 suffers from the disadvantage that explicit dedication (i.e., static reservation) of network resources for given data flows results in the reserved resources being unused (and therefore wasted) when the associated applications are not generating those given data flows. A router also could be statically configured to provide high priority to data flows specifying a particular differentiated services code point (DSCP) code point value, as described in RFC 2474 or 2475, or based on the Type of Services (ToS) field and IP source address in an IPv4 header, however the static configuration limits the availability of the network service to the manually configured sources; further, there is a lack of security in relying on DSCP (as well as the ToS field and IP source address field in an IPv4 header) that would enable a malicious source to capture the router resources by spoofing the DSCP, ToS, or IP source address values. The IETF RFCs 2205 and 2750 describe Resource Reservation Protocol (RSVP), where if a router has available resources to provide a QoS requested by a host node that is to receive the network service, the router reserves the required resources and forwards the request to the next router in the path of the data flow until the data source is reached; if, however there are insufficient resources at any point in the path of the data flow, the request is rejected.

Hence, the foregoing IP based proposals for providing guaranteed quality of service are inadequate for dynamically providing guaranteed QoS for high priority network services, such as public safety, emergency services, or first-responder services in crisis or disaster scenarios.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
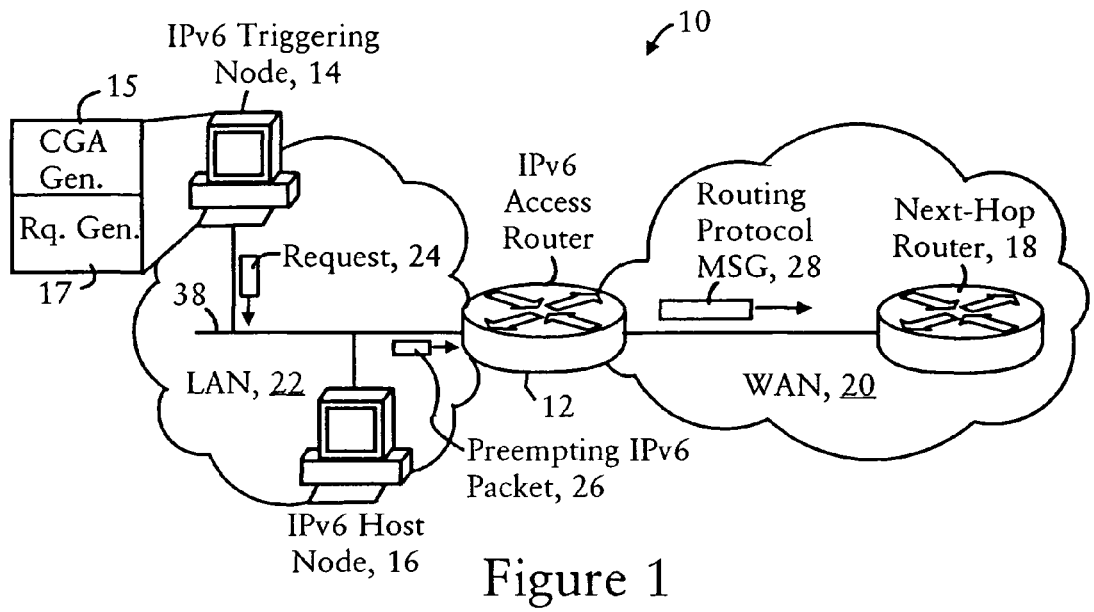
FIG. 1 illustrates an example network including an access router for providing secured preemptive network services to a host network node according to an example embodiment.

In one embodiment, a method includes receiving, by an access router, an Internet Protocol version 6 (IPv6) packet that specifies a request for executing a preemptive service for data packets specifying a prescribed flow label field value identified in the request. The method further includes attempting authentication of the request by the access router based on a prescribed secure authentication protocol. The method further includes implementing the preemptive service by the access router based on the authentication of the request, including passing any IPv6 data packet received from a host node and having an IPv6 header specifying the prescribed flow label field value and satisfying a prescribed security condition, and limiting transfer of any data packet that does not specify the prescribed flow label field value or satisfy the prescribed security condition.

In another embodiment, an apparatus comprises a local area network link interface configured for receiving a first Internet Protocol version 6 (IPv6) packet: the IPv6 packet specifies a request for executing a preemptive service for data packets specifying a prescribed flow label field value identified in the request. The apparatus also comprises a first executable resource configured for attempting authentication of the request based on a prescribed secure authentication protocol, and a second executable resource. The second executable resource is configured for implementing the preemptive service in the apparatus based on the authentication of the request, including passing any IPv6 data packet received by the local area network link interface and from a host node and having an IPv6 header specifying the prescribed flow label field value and satisfying a prescribed security condition, and limiting transfer of any data packet that does not specify the prescribed flow label field value or satisfy the prescribed security condition.

In yet another embodiment, a network comprises a host node configured for obtaining an Internet Protocol version 6 (IPv6) address according to a prescribed secure authentication protocol. The host node is configured for outputting a first IPv6 packet that specifies a request for executing a preemptive service for data packets specifying a prescribed flow label field value identified in the request. The network also comprises an access router configured for receiving the first IPv6 packet. The access router further is configured for attempting authentication of the request based on the prescribed secure authentication protocol. The access router further is configured for implementing the preemptive service based on the authentication of the request, including passing any IPv6 data packet having an IPv6 header specifying the prescribed flow label field value and satisfying a prescribed security condition, and limiting transfer of any data packet that does not specify the prescribed flow label field value or satisfy the prescribed security condition.

In yet another embodiment, an apparatus comprises a first resource configured for obtaining a secure Internet Protocol version 6 (IPv6) address for communication with an access router via a local area network link, and a second resource. The second resource is configured for outputting to the access router a first IPv6 packet that includes the secure IPv6 address and that specifies a request for executing, by the access router, a preemptive service for any preempting IPv6 data packet specifying a prescribed flow label field value, the prescribed flow label field value identified in the request.

DETAILED DESCRIPTION

Particular embodiments disclosed herein implement an access router configured for blocking or limiting transfer of Internet Protocol Version 6 (IPv6) packets based on initiating a preemptive service for a priority host node requiring absolute priority for transfer of IPv6 packets, regardless of any prior resource reservations for guaranteed QoS of latency-sensitive traffic. The preemptive service identifies priority IPv6 packets by a prescribed flow label field and satisfying a prescribed security condition, enabling the priority IPv6 packets to preempt existing resource reservations for subordinate (i.e., lesser-priority) IPv6 traffic that does not qualify for the preemptive service. Hence, preemptive services can be automatically initiated by law enforcement or first responder units in emergency or crisis situations, without the necessity of prior manual configuration of host network nodes or access routers.

FIG. 1 illustrates an example network 10 including an access router 12 for providing secured preemptive network services to a host network node in a local area network (LAN) 22, for example an IPv6 host network node 14 or 16, according to an example embodiment. The IPv6 node 14, referred to also as a triggering node, includes a resource 15 for generating a Cryptographically Generated Address, and a second resource 17 for generating a request 24 for preemptive services. As illustrated below with respect to FIGS. 3-5, the access router 12 receives the request 24 via a LAN link (e.g., wired or wireless Ethernet) 38 from the IPv6 node 14 for execution of the preemptive service for IPv6 data packets specifying a prescribed flow label field value. The access router 12 attempts authentication of the received request 24 based on a prescribed secure authentication protocol, for example according to Secure Neighbor Discovery (SEND) Protocol as specified in RFC 3971, where the access router 12 verifies that the IPv6 packet carrying the request 24 is from an authenticated host node: a host is authenticated as an authenticated host node authorized to request the preemptive service, based on the host having (1) a verifiable identity that authenticates the identity of the sender to prevent spoofing, for example, an authentic Cryptographically Generated Address (CGA) according to RFC 3972, and (2) a verifiable authorization to request the preemptive service. The access router 12, based on successful authentication of the request 24, implements the preemptive service based on creating a dynamic access control list entry that specifies that any IPv6 packet 26 having the prescribed flow label field value, and satisfying a prescribed security condition (e.g., received from a host node according to SEND protocol, flow label field value satisfies a prescribed criterion, etc.) is passed unconditionally and regardless of any prior resource reservations to a next-hop router.

Hence, any IPv6 packet 26 having the prescribed flow label field value and satisfying the prescribed security condition, also referred to herein as a preempting IPv6 packet 26, preempts any other non-priority packet (not shown), i.e., any packet not having the prescribed flow label field value or lacking the prescribed security condition. Consequently, implementation of the preemptive service by the access router 12 enables the preempting IPv6 packet 26 to preempt any non-priority packet, where the access router 12 can either block transfer of the non-priority packet, or limit transfer of the non-priority packet as subordinate to the resource requirements of any preempting IPv6 packet flows.

In addition, the preemptive service can be propagated throughout the network 10, where the access router 12 sends a routing protocol message 28 to a next-hop router within a wide area network (WAN) 20. Hence, the preemptive service can be implemented in the next-hop router 18 and subsequent routers in a path toward an identified destination for the flow of preempting IPv6 packets within the WAN 20.

Figure 2:
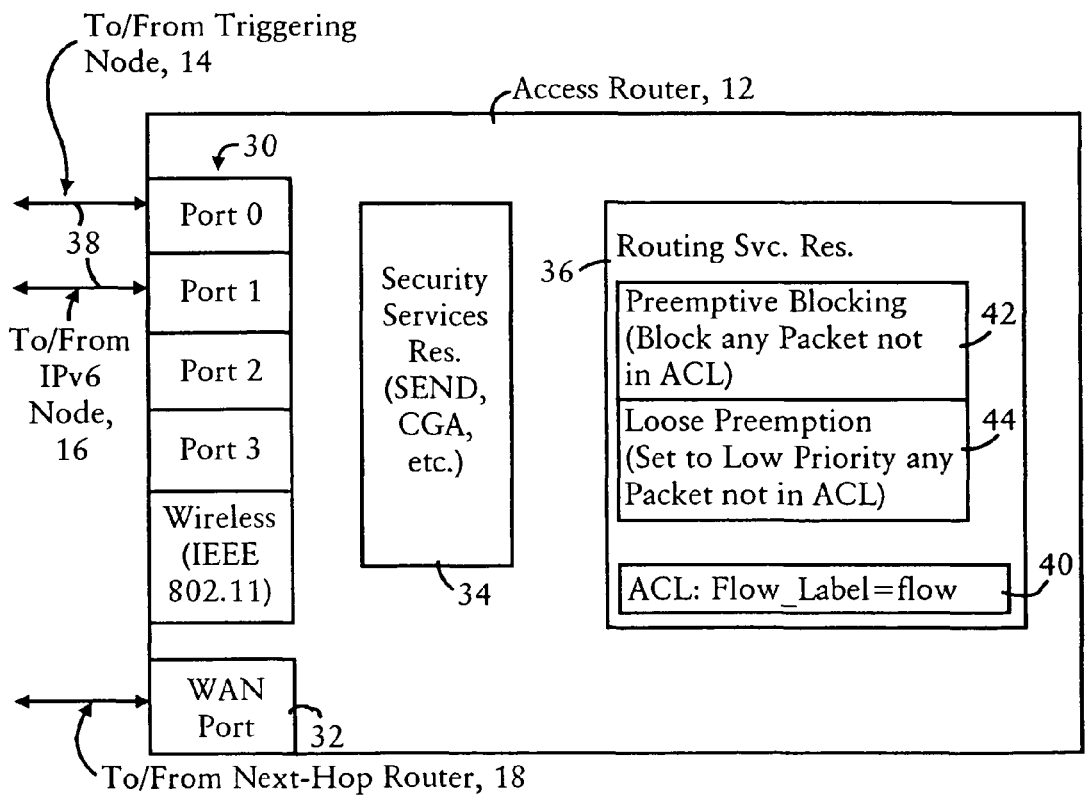
FIG. 2 illustrates an example access router in the system illustrated in FIG. 1.

FIG. 2 illustrates an example access router 12 in the network 10 illustrated in FIG. 1. The access router 12 includes a plurality of local area network (LAN) link interfaces 30, a WAN link interface 32, a security services resource 34, and a routing services resource 36. The security services resource 34 and the routing services resource 36 each can be implemented based on processor-based execution of executable code stored in a non-volatile memory, where the processor-based execution of the executable code results in program operations being performed in system memory and program application states being maintained in system memory for execution of the operations described herein.

Each LAN link interface 30 is configured for sending and receiving IPv6 packets to and from connected IPv6 host nodes (e.g., 14 and 16) via LAN links 38 according to a prescribed link layer protocol (e.g., 10/100/1000 Mb/s Ethernet, Wireless IEEE 802.11, etc.). As recognized in the art, multiple host nodes 14, 16 may share a given link 38. For example, the LAN link interface (e.g., Port 0) can be configured for receiving an IPv6 packet 24 that specifies a request for executing a preemptive service for data packets. Each LAN link interface 30 forwards each received IPv6 packet 24, 26 to the security services resource 34.

The security services resource 34 is configured for providing secure network services, for example SEcure Neighbor Discovery (SEND) as described in the IETF RFC 3971, and verification of Cryptographically Generated Addresses (CGA) and signed messages as described in RFC 3972. In particular, the security services resource 24 can be configured for validating the identity of each SEND-enabled IPv6 host node (e.g., 14 or 16) based on detecting a cryptographically generated address that secures the identity of the SEND-enabled IPv6 host node (e.g., 14 or 16). For example, each SEND-enabled IPv6 host node includes the CGA generator resource 15 to enable the IPv6 host node to obtain its own cryptographically generated IPv6 address by generating the CGA address in accordance with RFC 3972, for example by adding to the 64-bit IPv6 subnet prefix used in the LAN 22 a 64-bit interface identifier: the interface identifier can be generated by the IPv6 host node computing a cryptographic hash of a public key owned by the IPv6 host node, although the hash can include other inputs such as the 64-bit subnet prefix and other values. Hence, the 128 bit cryptographically generated IPv6 address is formed by the IPv6 host node combining the 64-bit subnet prefix for the local area network 22 with the cryptographically generated 64-bit interface identifier that forms the rightmost 64 bits of the IPv6 address. The CGA generator 15 of each SEND-enabled IPv6 host node (e.g., 14 or 16) also is configured to generate a signed message with a digital signature, as described in RFC 3972, that certifies that the message originated from the valid owner of the secure IPv6 CGA address. In summary, the CGA generator 15 of the SEND-enabled IPv6 host node generates a digital signature based on applying a private key (corresponding to the public key) to a prescribed hash algorithm such as the SHA-1 hash algorithm. Hence, the digital signature verifies that the message originated from the valid owner of the secure IPv6 address.

Hence, the security services resource 34 can authenticate the identity of any IPv6 host node sending a packet based on retrieving CGA parameters data (including the public key) from the received packet, performing an SHA-1 based hash of the CGA parameters data as described in RFC 3972, and comparing the results with the interface identifier (i.e., the rightmost 64 bits) of the source address to validate the CGA address. If the message is signed with a digital signature, the security services resource also can verify the digital signature to authenticate that the message originated from the valid owner of the CGA address.

Once the identity of the IPv6 host node has been authenticated as the authorized owner of the source IPv6 address (and not a rogue device attempting to "steal" the source IPv6 address), the security services 34 determines whether the authenticated IPv6 host node is an authenticated IPv6 host node that is authorized to request the preemptive service. As described below, the security services resource 34 may determine authentication of an IPv6 node, as an authenticated host authorized to request the preemptive service, based on a secure authentication protocol such as detection of a valid digital certificate that authenticates the host node as an authenticated host, or sending a query to an authentication authority (not shown) that can authenticate the requesting host as authorized to request the preemptive service.

Hence, the security services resource 34 is configured for attempting authentication of the received request 24 based on a prescribed secure authentication protocol such as the SEND protocol of RFC 3971 and/or the CGA protocol of RFC 3972, to determine whether the received request 24 for preemptive services is from a host node, also referred to herein as an IPv6 triggering node, that has been authenticated as an authenticated host authorized to request the preemptive service. The security services resource 34 also is configured for determining whether any preempting IPv6 packet 26 received from the local area network 22 satisfies a prescribed security condition, for example SEND/CGA authentication for SEND-enabled host network nodes, or other prescribed security conditions for host network nodes that are not SEND enabled, described below with respect to FIG. 5. Once received packets have been validated (e.g., authenticated and/or deemed to have satisfied a prescribed security condition), the IPv6 packet is forwarded to the routing services resource 36 for processing.

The routing services resource 36 is configured for implementing the preemptive service based on the authentication of the request 24 by the security services resource 34. In particular, the routing services resource 36 is configured for creating a dynamic access control list (ACL) entry 40 that specifies that any IPv6 packet 26 having a prescribed flow label field value ("flow"), as described in Section 6 of the Internet Protocol version 6 (IPv6) Specification (RFC 2460), is granted absolute priority relative to any other subordinate packet that is not identified within any ACL entry 40. Hence, the routing services resource 36 is configured for implementing the preemptive service requested by the request 24 by passing any IPv6 data packet received from the security services resource 34 and having an IPv6 header specifying the prescribed flow label field value ("flow"), and limiting transfer of any data packet that does not specify the prescribed flow label field value or satisfy the prescribed security condition. As described below, the routing services resource 36 may implement the preemptive service as a preemptive blocking service 42 that blocks any data packet that does not specify a flow label field value matching any entry 40 (and which has not been validated by the security services resource 34), and/or a "loose preemption" service 44 based on mapping any preempting IPv6 packet 26 to a high priority designation and any non-priority packet to a low priority designation according to existing QoS services, for example according to DSCP. Note that in the case of the routing services resources 36 implementing the "loose preemption" service 44 according to DSCP, spoofing by an untrusted source is no longer a concern because the preempting IPv6 packets have already been authenticated by the security services resource 34.

The routing services resource 36 also is configured for propagating throughout the wide area network 20 the preemptive service 42 and/or 44 for the preempting IPv6 packet 26, by transmitting a routing protocol message 28 to a next hop router 18. For example, if the next-hop router 18 is configured for implementing the preemptive blocking service 42, the routing services resource 36 can send the routing protocol message 28 to the next-hop router 18 to specify that preemptive blocking service 42 is to be provided for IPv6 packets specifying the prescribed flow label field value, for initiation of the preemptive blocking service 42 in the next-hop router 18. The routing protocol message 28 may be implemented, for example, as a Service Advertisement Framework (SAF) message configured for advertising services to routers within the wide area network 20, where the SAF message specifies that any IPv6 packet 26 from the access router 12 having a prescribed flow label field value ("flow") should be granted preemptive service. Alternatively, the routing protocol message 28 may be implemented as an interior border gateway protocol (iBGP) message.

If the next-hop router 18 is not configured for the preemptive blocking service 42, or if the strict preemption by the preemptive blocking service 42 of blocking non-preempting packets is not necessary, the routing services resource 36 can implement the "loose preemption" service 44 based on mapping any preempting IPv6 packet 26 to a high priority designation and any non-priority packet to a low priority designation, for example according to DSCP. The routing services resource 36 in that case sends the routing protocol message 28 to the next hop router 18 for initiation of the loose preemption service 44.

As described in further detail below, the access router 12 can implement preemptive services for preempting IPv6 packets 26 regardless of whether the preempting IPv6 traffic 26 originates from the same IPv6 triggering node 14 having sent the request 24 (illustrated in FIG. 3), or another IPv6 host node 16. In addition, the access router 12 can implement preemptive services for the second IPv6 host node 16 in response to the preemption request 24 from the IPv6 triggering host node 14, in both cases where the second IPv6 host node 16 is SEND enabled (illustrated in FIG. 4), or where the second IPv6 host node 16 is not SEND enabled (illustrated in FIG. 5).

Figure 3:
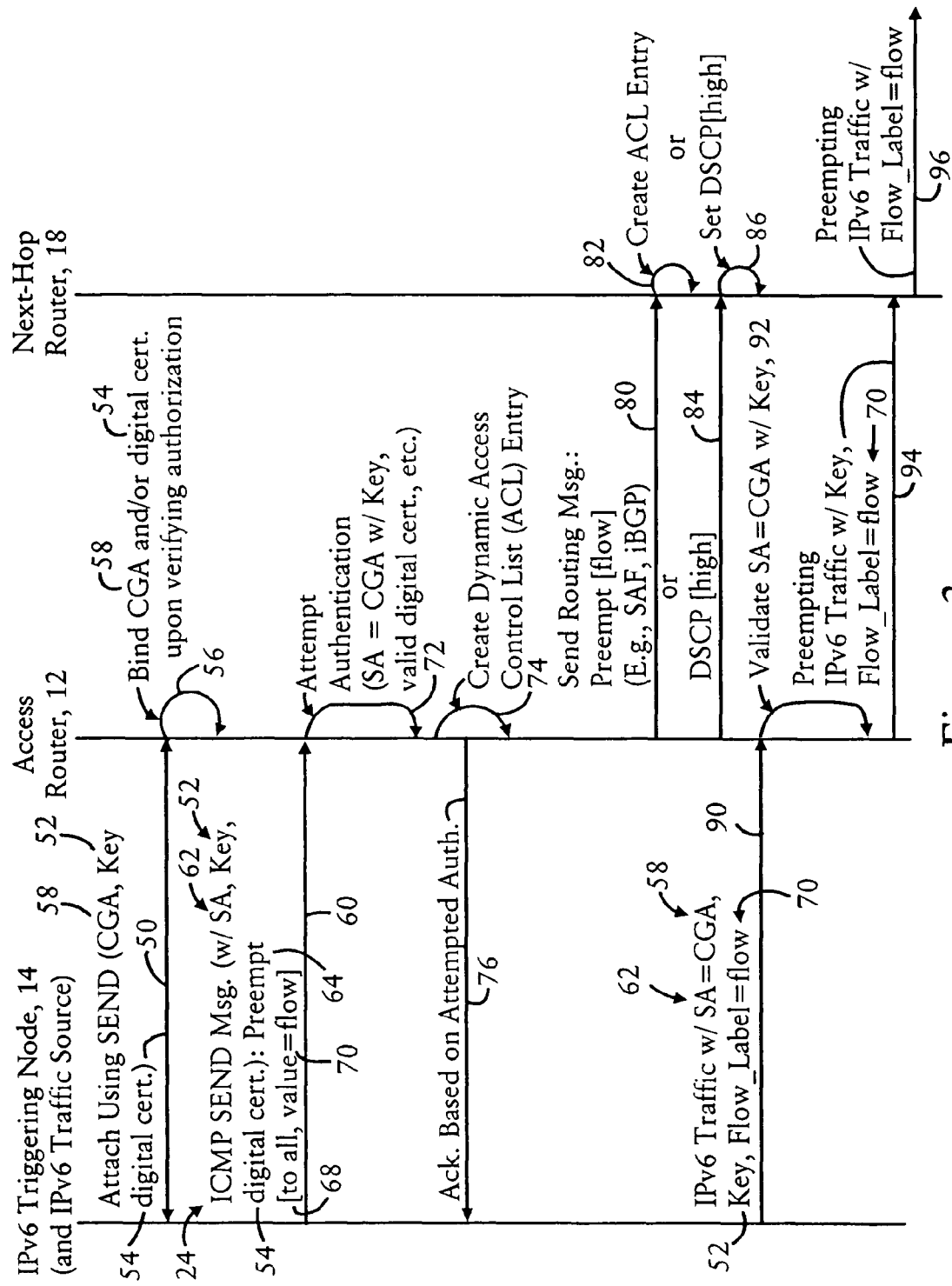
FIG. 3 illustrates an example method for implementing the secured preemptive network services by the access router of FIG. 1.

FIG. 3 illustrates an example method for implementing the secure preemptive network services by the access router 12. The steps described herein with respect to FIG. 3, as well as FIGS. 4 and 5, can be implemented as executable code stored on a computer readable medium (e.g., floppy disk, hard disk, EEPROM, CD-ROM, etc.) that are completed based on execution of the code by a processor; the steps described herein also can be implemented as executable logic that is encoded in one or more tangible media for execution (e.g., programmable logic arrays or devices, field programmable gate arrays, programmable array logic, application specific integrated circuits, etc.).

Figure 4:
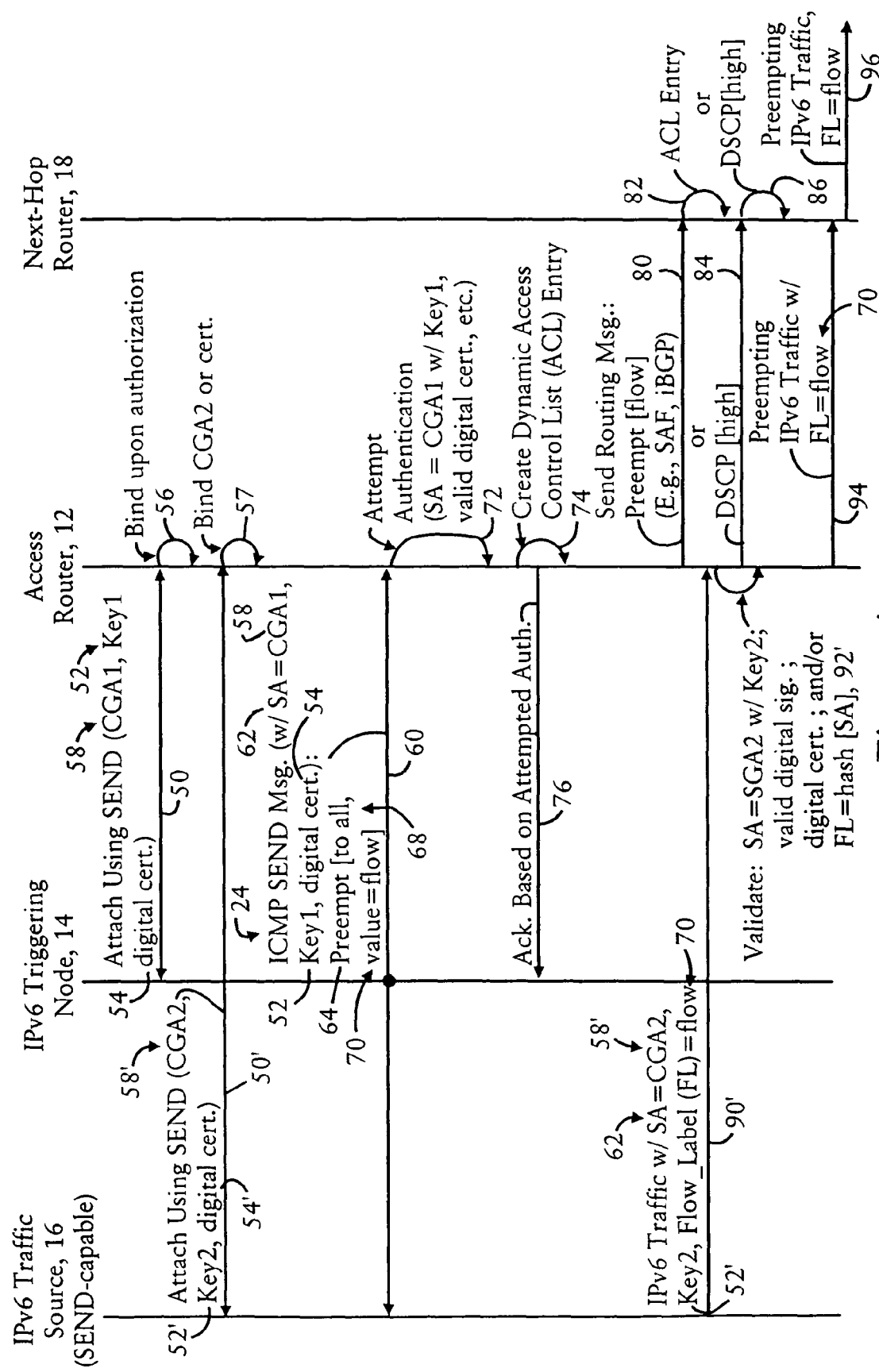
FIG. 4 illustrates a second example method for implementing the secured preemptive network services by the access router of FIG. 1.
Figure 5:
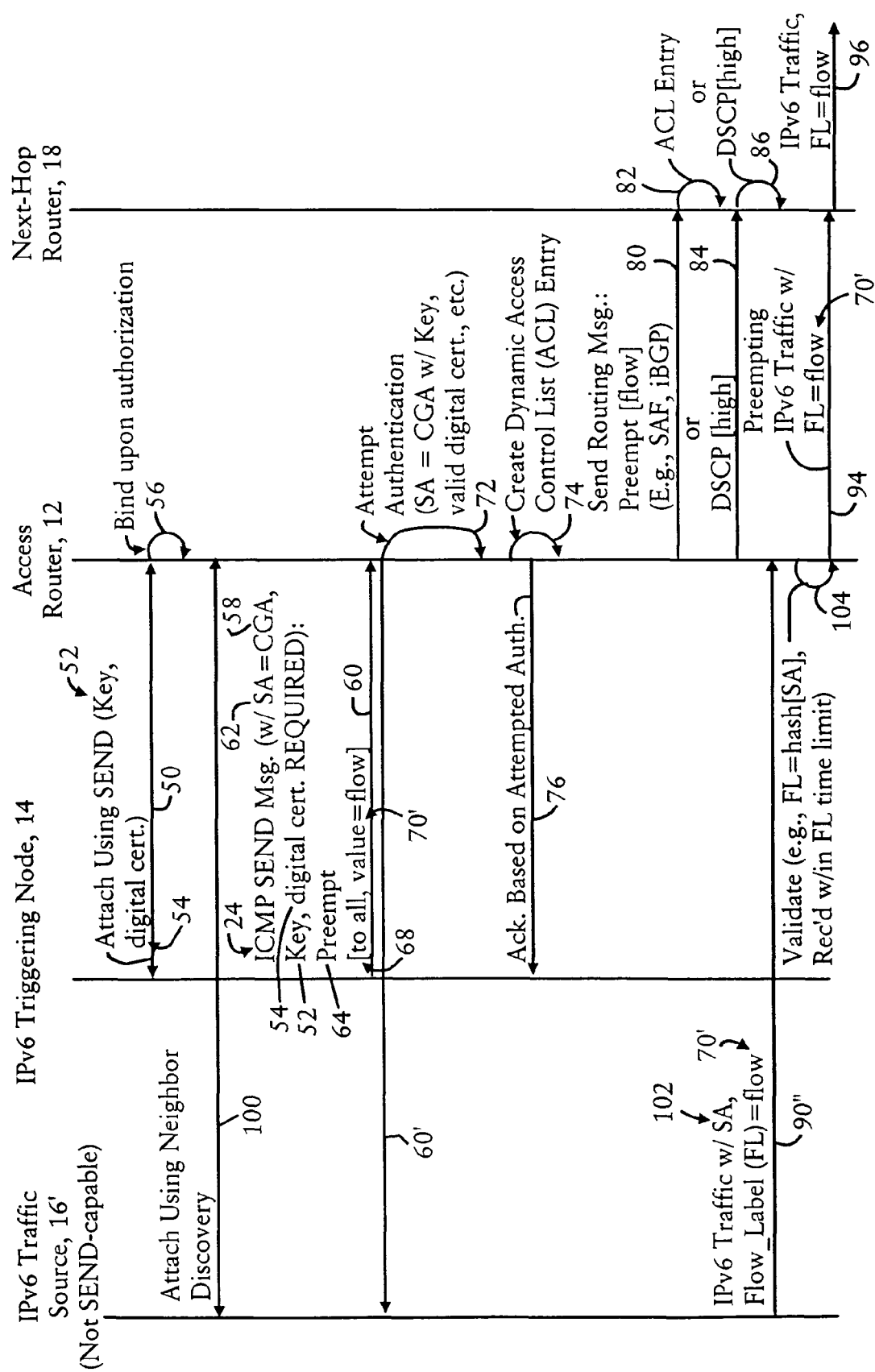
FIG. 5 illustrates a third example method for implementing the secured preemptive network services by the access router of FIG. 1.

Each of the methods of FIGS. 3, 4 and 5 begin with the IPv6 triggering node 14 attaching to the IPv6 access router 12 in step 50 according to a secure protocol, for example the SEND and CGA protocols as specified in RFC 3971 and RFC 3972, respectively, including the CGA generator 15 of the IPv6 triggering node 14 generating its own CGA address 58. The IPv6 triggering node 14 may authenticate itself at the time of attachment based on the CGA generator 15 sending in step 50 a message to the access router 12 that includes its CGA address 58 and its public key 52 for validation of the CGA address, and a secure token such as an RSA signature (generated by the IPv6 triggering node using its private key), or digital certificate (e.g., X.509 certificate) 54 to establish the authenticity of the IPv6 triggering node 14 as an authenticated host authorized to request the preemptive service.

In response, the security services resource 34 of the access router 12 validates in step 56 the cryptographically generated address (CGA) as described above for example with respect to RFC 3972, validates the identity of the IPv6 triggering node 14 (e.g., using the RSA signature), and validates the IPv6 triggering node 14 is authorized to request the preemptive service; for example, the security services resource 34 may verify the supplied digital certificate 54 with a certifying authority (not shown); in the absence of the digital certificate (e.g., if the message includes an RSA signature but not an X.509 certificate), the security services resource 34 may send a query to an authentication authority that validates that the IPv6 triggering node 14 is authorized to request the preemptive service. In response to successful validation of the IPv6 triggering node 14 as an authenticated host authorized to request the preemptive service, the security services resource 34 creates in step 56 an internal data structure that associates the binding between the CGA 58 and/or the digital certificate 54 with a successful authentication of an authenticated host authorized to request the preemptive service. Hence, only fully authenticated sources 14 can request preemption of network resources, preventing attacks on network resources by unauthorized sources.

The request generator 17 of the IPv6 triggering node 14 sends in step 60 an Internet Control Message Protocol (ICMP) message 24, the ICMP message 24 implemented as a new form of a SEND message according to the SEND protocol of RFC 3971. The ICMP SEND message 24 generated by the request generator 17 includes the source address 62 (equal to the CGA 58) of the IPv6 triggering node 14, plus the SEND protocol parameters of the public key 52, and optionally RSA signature to verify the ICMP SEND message 24 is from the owner of the CGA address 58; the ICMP SEND message 24 also may include the digital certificate 54, for example if the IPv6 triggering node 14 has not previously authenticated itself as authorized to request the preemptive service in steps 50 and 56. The ICMP SEND message 24 also specifies the specific preempt request 64, a destination identifier 68 and a prescribed flow label field value 70. As illustrated in FIGS. 3, 4, and 5, the destination identifier 68 specifies a multicast address, so that all host nodes (e.g., 16 of FIGS. 1 and 4 and 16' of FIG. 5) and routers (not shown) in the local area network 22 will receive the message 24. The ICMP SEND message 24 is received in the access router 12 by the LAN link interface port 30 providing connectivity to the IPv6 triggering node 14.

The ICMP SEND message 24 is forwarded by the LAN link interface port 30 to the security services resource 34. The security services resource 34 attempts authentication of the ICMP SEND message 24 in step 72, for example based on validating that the host node having sent the ICMP SEND message 24 is an authenticated host according to SEND or CGA protocols, and determining if the authenticated host already has been validated in step 56 as an authenticated host authorized to request the preemptive service. In particular, the security services resource 34 may verify that the source IP address 62 specified in the ICMP SEND message 24 is a valid cryptographically generated address 58 based on the corresponding public key 52 supplied in the ICMP SEND message 24, where the public key 52 is used to determine whether the source address 62 specifies a valid CGA 58; if a digital signature is present, the security services resource 34 verifies whether the ICMP SEND message 24 is from the authorized owner of the CGA address 58. Upon verifying the identity of the source of the ICMP SEND message 24, the security services resource 34 completes authentication of the request by detecting a binding authorization for the CGA address 58 (created in step 56); if a binding authorization is detected, the ICMP SEND message 24 is forwarded to the routing services resource 36.

If in step 72 the operations of step 56 have not yet been performed (i.e., the source of the ICMP SEND message 24 has not yet been validated as an authenticated host), the security services resource 34 performs the authentication operations of step 56, to determine in step 72 whether a valid digital certificate 54 that authenticates the host node as an authenticated host authorized to request the preemptive service is present in the ICMP message 24; alternately, the security services resource 34 may send a query to a trusted authentication authority (not shown) that can authenticate the requesting host as authorized to request the preemptive service.

If in step 72 the source of the ICMP SEND message 24 is successfully authenticated as authorized to request the preemptive service, the security services resource 34 forwards the request to the routing services resource 36, which creates in step 74 a dynamic access control list entry 40 that includes at least the flow value 70, and sends an acknowledgment in step 76 acknowledging initiation of the preemptive service (if in step 72 authentication failed, then the security services resource 34 may send in step 76 the acknowledgment that authentication failed). As described below, the flow value 70 can be generated by the IPv6 triggering node 14 as a hash of the source address of the IPv6 traffic source.

The routing services resource 36 also can send in step 80 a routing message 28 to the next hop router 18 specifying that the preemptive blocking services 42 should be implemented for any IPv6 packet output from the IPv6 access router 12 and having the prescribed flow label field value 70. As described previously, the routing message 28 can be sent according to a prescribed SAF protocol, or a prescribed interior BGP (iBGP) protocol. The next hop router 18 responds to the routing message 28 sent in step 80 by creating in step 82 its own corresponding ACL entry 40. Alternately, if the next hop router 18 is not configured for preemptive blocking services 42, the routing services resource 36 in the access router 12 may send a DSCP request in step 84 specifying that packets having a prescribed DSCP value should be given a high priority, in which case the next hop router 18 in step 86 would update its internal state tables to reflect the prescribed DSCP value is to be given a high priority for routing purposes.

Once the routing services resource 36 and the next hop router 18 have initiated implementation of the preemptive service 42 or 44, any preempting IPv6 packets 26 that specify a prescribed flow label field value 70 and that meet the prescribed security condition, described below, are passed by the routing service resource 36 to the next hop router 18 as a preemptive packet having priority over any other subordinate packet that does not have a corresponding entry 40 in the dynamic access control list. For example, FIG. 3 illustrates the example where the IPv6 triggering node 14 also is the source of the preempting IPv6 traffic 26: the IPv6 triggering node 14 (e.g., the CGA generator 15 or the request generator 17, depending on implementation) outputs in step 90 a preempting IPv6 packet 26 that specifies the cryptographically generated address 58 in the source address field 62, the public key 52, and the flow label field value "flow" 70 in the flow label field of the IPv6 header.

The security services resource 34 determines whether the received IPv6 packet 26 satisfies a prescribed security condition: since the packet 26 transmitted in step 90 of FIG. 3 is from a SEND-enabled source, the security services resource 34 verifies in step 92 whether the source IP address 62 specifies a valid cryptographically generated address 58 based on the corresponding public key 52 supplied in the IPv6 packet 26, described in further detail in RFC 3971 and RFC 3972. If in step 92 the received packet 26 satisfies the prescribed security condition of the source address specifying a valid cryptographically generated addresses 58 relative to the supplied public key 52 (and optionally including a valid RSA signature), the security services resource 34 passes the packet 26 to the routing services resource 36. In response to detecting the prescribed flow label field value ("flow") 70 of the packet 26 as matching the dynamic access control list entry 40, the routing services resource 36 outputs the preempting IPv6 packet 26 to the WAN port 32 for transfer to the next hop router 18 in step 94. As described above, the next hop router 18 also is configured for implementing the preemptive service by forwarding the preempting IPv6 packet 26 to its next hop router in step 96 toward the packet destination, while limiting transfer of non-priority packets. As described previously, the routing service resource 36 and the next hop router 18 each are configured for implementing the preemptive service by limiting transfer of any data packet that does not have a flow label field value 70 matching an entry 40 of the access control list, and which does not satisfy the security conditions of the security services resource 34. The preemptive service may be implemented by the routers 12 and 18 either by preemptive blocking 42, where any packet that does not specify the appropriate flow label field value in the ACL entry 40 is blocked, or loose preemption 44, where the preempting IPv6 packet 26 having a matching flow label field value 70 in the ACL entry 40 is set to a high-priority DSCP value, and any packet that does not specify the appropriate flow label field value in the ACL entry 40 is set to a low priority DSCP value that is subordinate to the high-priority DSCP value.

FIG. 4 is a diagram illustrating a variation of FIG. 3, where the preempting IPv6 packet 26 is output in step 90' by the IPv6 host node 16, distinct from the IPv6 triggering node 14. As illustrated in FIG. 4, the IPv6 host node 16 outputting the IPv6 packet 26 (i.e., the "IPv6 traffic source") is SEND capable according to RFC 3971 and RFC 3972. Hence, the IPv6 traffic source 16' attaches in step 50' to the access router 12, and may send a packet to the access router 12 including its corresponding cryptographically generated address ("CGA2") 58', its public key ("Key2") 52' and optionally its digital certificate 54'; the security services resource 34, if desired, in response can create an internal data structure that binds in step 57 the cryptographically generated address ("CGA2") 58' or the certificate 54' as an authenticated source (note, however, the IPv6 traffic source 16 is not authorized to request initiation of preemptive service, but only to transmit preempting IPv6 packets 26 according to an existing preemptive service).

As described previously with respect to step 60 of FIG. 3, the ICMP SEND message 24 is sent to a multicast "all nodes" address in step 60, hence the IPv6 traffic source 16 receives the ICMP SEND message 24 in step 60. The IPv6 traffic source 16 can be configured to send only preempting packets 24 with the prescribed flow label field value ("flow") 70 in response to detecting the preempt command 64 in the ICMP message 24. Hence, the security services resource 34 validates that the received IPv6 packet 26 satisfies the prescribed security condition in step 92'. For example, the prescribed security condition in step 92' in this example of a SEND-capable traffic source 16 may include verifying the IPv6 traffic source 16 according to SEND protocol (e.g., based on verifying the source IP address 62 specified in the preempting IPv6 packet 26 is the cryptographically generated address 58' based on the corresponding key 52' supplied in the packet 26, detecting in the received IPv6 packet 26 a valid digital signature as described above, or detecting a valid digital certificate either in the IPv6 packet 26 or received previously as described above with respect to step 57). Upon successful validation of the cryptographically generated address 58' in step 92', the routing service resource 36 outputs in step 94 the preempting IPv6 packet 26 based on the prescribed flow label field value 70 identified in the ACL entry 40. As described previously, any non-priority packet is either blocked (if the preemptive blocking service 42 is implemented) or limited to low priority status (if the loose preemption service 44 is implemented).

An alternative prescribed security condition in step 92' may be implemented by the IPv6 triggering node 14 configured to set the flow label field value 70 to equal a hash (e.g., an SHA-1 hash) of the IPv6 CGA address 58' of the IPv6 traffic source: if differential services are implemented in the access router 12 and the next-hop router 18, then the use of routing messages in steps 80 and 84 is not required, since any remote node (e.g., the next-hop router or a destination access router) can verify the priority of the packet simply by confirming that the flow label field value 70 equals the hash of the source address of the received packet. In this specific example of using differential services and a hash of the source address, however, the access router 12 should be configured to prevent a low-priority packet from obtaining high-priority service in the WAN 20, by configuring the access router 12 to reject any packet having a flow label field value 70 that equals a hash of the source address of the packet, but where the flow label field value 70 has not been explicitly authorized by the IPv6 triggering node 14. In other words, non-priority packets having flow label field values equaling their source address can be blocked to prevent the packets from being mis-interpreted as high-priority packets in the WAN 20.

FIG. 5 is a variation of FIG. 4, where the IPv6 traffic source 16' is not SEND-capable, but rather uses conventional neighbor discovery techniques in step 100 as described in RFC 2461 and RFC 2462. In this case, the IPv6 traffic source 16' uses an unsecured IPv6 address and must be authenticated relative to a trusted source. Hence, the security services resource 34 in this example may require the ICMP SEND message 24 to include the X.509 digital certificate 54 in addition to the cryptographically generated address 58. The ICMP SEND message 24 also specifies a modified flow label field value 70', where the flow label field value 70' may be set by the IPv6 triggering node 14 calculating a hash of the source address value 102 used by the IPv6 traffic source 16'. Hence, the ACL entry 40 created in step 74 of FIG. 5 specifies the flow label field value 70', calculated by the IPv6 triggering node 14 as a hash of the source address value 102 of the IPv6 traffic source 16'.

As illustrated in FIG. 5, the access router 12 outputs in step 60' the ICMP message 24 to the IPv6 traffic source 16' due to the destination field 68 specifying a multicast address, for example in the case where the IPv6 triggering node 14 and the IPv6 traffic source 16' are connected to different network interface ports 30. Hence, the IPv6 traffic source 16' utilizes the flow value 70' from the received ICMP message 24, and outputs in step 90" the IPv6 packet 26 having the unsecured IPv6 source address value 102 and the flow label field value 70'. Other IPv6 host nodes that are SEND-aware can be configured for disregarding the ICMP send message 24, where prescribed flow identification procedures can be established between the IPv6 triggering node 14 and the other SEND-aware IPv6 host nodes.

Since the source address 102 is not a cryptographically generated address, the security services resource 34 can be configured to attempt to determine in step 104 whether the IPv6 packet 26 satisfies a prescribed security condition by determining whether the flow label field value 70' matches a prescribed hash of the unsecured IPv6 source address 102, and/or whether the IPv6 packet 26 is received within a prescribed time limit set for the flow label field value 70'. Hence, use of the flow label field value 70' as a hashed version of the unsecured IPv6 address 102 assigned to the IPv6 traffic source 16' ensures that only the IPv6 traffic source 16' is able to use the preemption services, even if other network nodes detect the flow label field value 70'. Upon determining that the IPv6 packet 26 satisfies the prescribed security condition in step 104, the security services resource 34 passes the packet 26 to the routing service resource 36 for implementation in step 94 according to the selected preemptive service 42 or 44.

According to the disclosed embodiments, a dynamic secured preemption mechanism can be implemented in IPv6 access routers using existing IPv6 protocols. The dynamic preemption mechanism does not require any prior configuration of the access routers, rather an access control list specifying an authorized list of sources can be established and identified based on flow identification labels, where only authenticated host nodes with the proper credentials can initiate the preemptive services and/or send the preempting packets. The preemptive services can be implemented to block non-priority packets entirely in high priority situations where network resources are limited, or to reduce the priority of the non-priority packets relative to the preempting packets in case there remains sufficient network resources for lower priority traffic. Such preemptive services can be implemented for various applications, for example voice over IP telephony, video conferencing, or video streaming for priority applications and users such as first responders, emergency personnel, etc.

What is claimed is:

1. A method comprising:
   receiving, by an access router, a first Internet Protocol version 6 (IPv6) packet that specifies a request for executing a preemptive service for IPv6 data packets specifying a prescribed flow label field value, the request specifying the prescribed flow label field value associated with the preemptive service, the first IPv6 packet further specifying an authentication parameter for authentication of the request;
   attempting the authentication of the request by the access router based on the authentication parameter relative to a prescribed secure authentication protocol, to determine whether the IPv6 packet is authorized to request the preemptive service; and
   implementing the preemptive service by the access router based on the authentication of the request, including creating an entry in the access router enabling the prescribed flow label field value to invoke the preemptive service, passing any IPv6 data packet received from a host node and having an IPv6 header specifying the prescribed flow label field value and further having a corresponding authentication parameter satisfying a prescribed security condition, and limiting transfer of any data packet that does not specify the prescribed flow label field value or satisfy the prescribed security condition.

2. The method of claim 1, further comprising receiving the first IPv6 packet from the host node, the attempting authentication including validating the host node as an authenticated host authorized to request the preemptive service, according to the prescribed secure authentication protocol.

3. The method of claim 2, wherein the validating includes at least one of verifying a source IP address specified in the first IPv6 packet is a valid cryptographically generated address based on a corresponding key supplied in the first IPv6 packet as the corresponding authentication parameter, or detecting as the corresponding authentication parameter a valid digital certificate that authenticates the host node as the authenticated host authorized to request the preemptive service.

4. The method of claim 2, wherein the prescribed security condition includes verifying a source IP address specified in the corresponding any IPv6 packet is a valid cryptographically generated address based on a corresponding key supplied in the corresponding any IPv6 packet as the corresponding authentication parameter.

5. The method of claim 1, further comprising sending a routing protocol message to a next-hop router for implementation in the next-hop router of the preemptive service for the any IP data packet specifying the prescribed flow label field value, the limiting transfer including one of blocking the any data packet that does not specify the prescribed flow label field value or satisfy the prescribed security condition, or transferring the any data packet subordinate to the any IPv6 data packet.

6. The method of claim 1, wherein:
   the passing includes setting the corresponding any IPv6 data packet to specify a high priority according to a differentiated services routing protocol, and outputting the corresponding any IPv6 data packet, having the specified high-priority, to a next hop router; and
   the limiting transfer including setting the corresponding any data packet to specify a low priority according to the differentiated services routing protocol, and outputting the corresponding any data packet, having the specified low priority, to the next hop router.

7. The method of claim 1, further comprising receiving the first IPv6 packet from a second host node distinct from the host node, the attempting authentication including validating the second host node as an authenticated host authorized to request the preemptive service, according to the prescribed secure authentication protocol.

8. The method of claim 7, further comprising detecting first and second cryptographically generated addresses for the host node and the second host node and first and second keys, respectively, as the respective authentication parameters;
   the validating including at least one of verifying a source IP address specified in the first IPv6 packet is the second cryptographically generated address based on a corresponding key supplied in the first IPv6 packet as the corresponding authentication parameter, or detecting as the corresponding authentication parameter a valid digital certificate that authenticates the second host node as the authenticated host authorized to request the preemptive service;
   the prescribed security condition including at least one of verifying the source IP address specified in the corresponding any IPv6 packet is the first cryptographically generated address of the host node based on a corresponding key supplied in the corresponding any IPv6 packet as the corresponding authentication parameter, detecting as the corresponding authentication parameter a valid digital certificate that authenticates the host node as authorized to use the preemptive service, or validating the prescribed flow label field value in the corresponding IPv6 packet matches a prescribed hash of the corresponding source IPv6 address as the corresponding authentication parameter.

9. The method of claim 7, wherein:
the host node attaches to the access router according to an unsecured network discovery protocol and the corresponding any IPv6 data packet specifies an unsecured IPv6 source address in the IPv6 header;
the validating including verifying a source IP address specified in the first IPv6 packet is a valid cryptographically generated address based on a corresponding key supplied in the first IPv6 packet as the corresponding authentication parameter, and detecting as the corresponding authentication parameter a valid digital certificate that authenticates the second host node as the authenticated host authorized to request the preemptive service;
the prescribed security condition including validating the prescribed flow label field value in the corresponding any IPv6 data packet according to a prescribed validation criterion.

10. The method of claim 9, wherein the prescribed validation criterion includes at least one of matching the prescribed flow label field value relative to a prescribed hash of the unsecured IPv6 source address, or determining whether the corresponding any IPv6 data packet is received within a prescribed time limit established for the prescribed flow label field value.

11. An apparatus comprising:
a local area network link interface configured for receiving a first Internet Protocol version 6 (IPv6) packet that specifies a request for executing a preemptive service for IPv6 data packets specifying a prescribed flow label field value, the request specifying the prescribed flow label field value associated with the preemptive service, the first IPv6 packet further specifying an authentication parameter for authentication of the request;
a first circuit configured to attempt the authentication of the request based on the authentication parameter relative to a prescribed secure authentication protocol, to determine whether the IPv6 packet is authorized to request the preemptive service; and
a second circuit configured to implement the preemptive service in the apparatus based on the authentication of the request, including creating in the apparatus an entry enabling the prescribed flow label field value to invoke the preemptive service, passing any IPv6 data packet received by the local area network link interface and from a host node and having an IPv6 header specifying the prescribed flow label field value and further having a corresponding authentication parameter satisfying a prescribed security condition, and limiting transfer of any data packet that does not specify the prescribed flow label field value or satisfy the prescribed security condition.

12. The apparatus of claim 11, wherein the local area network link interface is configured for receiving the first IPv6 packet from the host node, the first circuit configured to attempt authentication based on validating the host node as an authenticated host authorized to request the preemptive service, according to the prescribed secure authentication protocol.

13. The apparatus of claim 12, wherein the first circuit is configured to validate the host node based on at least one of verifying a source IP address specified in the first IPv6 packet is a valid cryptographically generated address relative to a corresponding key supplied in the first IPv6 packet as the corresponding authentication parameter, or detecting as the corresponding authentication parameter a valid digital certificate that authenticates the host node as the authenticated host authorized to request the preemptive service.

14. The apparatus of claim 12, wherein the prescribed security condition includes verifying a source IP address specified in the corresponding any IPv6 packet is a valid cryptographically generated address based on a corresponding key supplied in the corresponding any IPv6 packet as the corresponding authentication parameter.

15. The apparatus of claim 11, wherein the second circuit is configured to output a routing protocol message to a next-hop router for implementation in the next-hop router of the preemptive service for the any IP data packet specifying the prescribed flow label field value, the limiting transfer including one of blocking the any data packet that does not specify the prescribed flow label field value or satisfy the prescribed security condition, or transferring the any data packet subordinate to the any IPv6 data packet.

16. The apparatus of claim 11, wherein:
the second circuit is configured to set the corresponding any IPv6 data packet to specify a high priority according to a differentiated services routing protocol, and outputting the corresponding any IPv6 data packet, having the specified high-priority, to a next hop router;
the second circuit further configured to limit transfer based on setting the corresponding any data packet to specify a low priority according to the differentiated services routing protocol, and output the corresponding any data packet, having the specified low priority, to the next hop router.

17. The apparatus of claim 11, wherein the local area network link interface is configured to receive the first IPv6 packet from a second host node distinct from the host node, the first circuit configured to attempt authentication based on validating the second host node as an authenticated host authorized to request the preemptive service, according to the prescribed secure authentication protocol.

18. The apparatus of claim 17, wherein the first circuit is configured to detect first and second cryptographically generated addresses for the host node and the second host node and first and second keys, respectively, as the respective authentication parameters;
the first circuit configured to validate the second host node based on at least one of verifying a source IP address specified in the first IPv6 packet is the second cryptographically generated address based on a corresponding key supplied in the first IPv6 packet as the corresponding authentication parameter, or detecting as the corresponding authentication parameter a valid digital certificate that authenticates the second host node as the authenticated host authorized to request the preemptive service;
the prescribed security condition including at least one of verifying the source IP address specified in the corresponding any IPv6 packet is the first cryptographically generated address of the host node based on a corresponding key supplied in the corresponding any IPv6 packet as the corresponding authentication parameter, detecting as the corresponding authentication parameter a valid digital certificate that authenticates the host node as authorized to user the preemptive service, or validating the prescribed flow label field value in the corresponding IPv6 packet matches a prescribed hash of the corresponding source IPv6 address as the corresponding authentication parameter.

19. The apparatus of claim 17, wherein:
the host node attaches to the apparatus according to an unsecured network discovery protocol and the corresponding any IPv6 data packet specifies an unsecured IPv6 source address in the IPv6 header;
the first circuit configured to validate the second host node based on verifying a source IP address specified in the first IPv6 packet is a valid cryptographically generated address based on a corresponding key supplied in the first IPv6 packet as the corresponding authentication parameter, and detecting as the corresponding authentication parameter a valid digital certificate that authenticates the second host node as the authenticated host authorized to request the preemptive service;
the prescribed security condition including validating the prescribed flow label field value in the corresponding any IPv6 data packet according to a prescribed validation criterion.

20. The apparatus of claim 19, wherein the prescribed validation criterion includes at least one of matching the prescribed flow label field value relative to a prescribed hash of the unsecured IPv6 source address, or determining whether the corresponding any IPv6 data packet is received within a prescribed time limit established for the prescribed flow label field value.

21. An apparatus comprising:
means for receiving a first Internet Protocol version 6 (IPv6) packet that specifies a request for executing a preemptive service for IPv6 data packets specifying a prescribed flow label field value, the request specifying the prescribed flow label field value associated with the preemptive service, the first IPv6 packet further specifying an authentication parameter for authentication of the request;
means for attempting the authentication of the request based on the authentication parameter relative to a prescribed secure authentication protocol, to determine whether the IPv6 packet is authorized to request the preemptive service; and
means for implementing the preemptive service in the apparatus based on the authentication of the request, the means for implementing configured for creating an entry in the apparatus enabling the prescribed flow label field value to invoke the preemptive service, passing any IPv6 data packet received by the means for receiving and from a host node and having an IPv6 header specifying the prescribed flow label field value and further having a corresponding authentication parameter satisfying a prescribed security condition, the means for implementing further configured for limiting transfer of any data packet that does not specify the prescribed flow label field value or satisfy the prescribed security condition.

* * * * *